(12) United States Patent
Bennett, III et al.

(10) Patent No.: US 8,300,637 B1
(45) Date of Patent: Oct. 30, 2012

(54) ATTRIBUTE ASSIGNMENT FOR IP DUAL STACK DEVICES

(75) Inventors: John H. Bennett, III, Lawrence, KS (US); Jeremy R. Breau, Leawood, KS (US); Robert J. Pierce, Castle Rock, CO (US); Frederick C. Rogers, Olathe, KS (US); Dale E. Winn, Adrian, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 888 days.

(21) Appl. No.: 12/348,672

(22) Filed: Jan. 5, 2009

(51) Int. Cl.
*H04L 12/28* (2006.01)

(52) U.S. Cl. .......................... 370/389; 370/393; 370/466

(58) Field of Classification Search .................. 370/389, 370/393, 466
See application file for complete search history.

(56) References Cited

U.S. PATENT DOCUMENTS

| | | | |
|---|---|---|---|
| 6,262,976 B1 * | 7/2001 | McNamara | 370/254 |
| 6,335,966 B1 * | 1/2002 | Toyoda | 379/100.06 |
| 6,604,110 B1 * | 8/2003 | Savage et al. | 707/602 |
| 6,654,779 B1 * | 11/2003 | Tsuei | 718/101 |
| 6,718,030 B1 * | 4/2004 | Turner et al. | 379/221.02 |
| 6,724,724 B1 * | 4/2004 | Swenson et al. | 370/231 |
| 7,075,932 B2 * | 7/2006 | Matsuhira et al. | 370/395.31 |
| 7,218,722 B1 * | 5/2007 | Turner et al. | 379/221.02 |
| 7,447,182 B2 * | 11/2008 | Chowdhury et al. | 370/338 |
| 7,630,374 B2 * | 12/2009 | Inouchi et al. | 370/392 |
| 7,962,569 B2 * | 6/2011 | Sewall et al. | 709/217 |
| 2003/0048804 A1 * | 3/2003 | Inouchi et al. | 370/466 |
| 2003/0078035 A1 * | 4/2003 | Sheha et al. | 455/414 |
| 2003/0078982 A1 * | 4/2003 | Ogawa | 709/206 |
| 2004/0004940 A1 * | 1/2004 | Abrol et al. | 370/252 |
| 2005/0015507 A1 * | 1/2005 | Chin | 709/230 |
| 2006/0159243 A1 * | 7/2006 | Mangione et al. | 379/93.11 |
| 2006/0227780 A1 * | 10/2006 | Inouchi et al. | 370/389 |
| 2007/0121590 A1 * | 5/2007 | Turner et al. | 370/352 |
| 2007/0255848 A1 * | 11/2007 | Sewall et al. | 709/232 |
| 2008/0072301 A1 * | 3/2008 | Chia et al. | 726/8 |
| 2010/0100629 A1 * | 4/2010 | Raciborski et al. | 709/228 |
| 2011/0141884 A1 * | 6/2011 | Olsson et al. | 370/225 |
| 2011/0302322 A1 * | 12/2011 | Raciborski et al. | 709/245 |
| 2012/0102203 A1 * | 4/2012 | Richardson et al. | 709/226 |

* cited by examiner

*Primary Examiner* — John Blanton
*Assistant Examiner* — Jay P Patel (57) ABSTRACT

Methods and computer-readable media are provided to allow for the assignment of domain-name system (DNS) servers, static IP addresses, and dynamic home agents to a device requesting the establishment of an IPv6 data session. DNS servers may be determined for a particular device based on one or more device capabilities, such as the type of device or certain products or services to which the device is subscribed. The device capabilities are determined by querying a customer-profile database that defines certain information about users and devices, such as static IP addresses and device capabilities. The DNS servers are used by a device to translate a host name into a host address, in addition to establishing an IPv6 data session. Once determined, a component, such as an Authentication, Authorization, and Accounting (AAA) server may send the attributes to a packet-routing component, which assigns the DNS servers to the device.

18 Claims, 10 Drawing Sheets

ATTRIBUTE ASSIGNMENT FOR IP DUAL STACK DEVICES

SUMMARY

The present invention is defined by the claims below. This summary is provided to introduce a selection of concepts in a simplified form that are further described below in the Detailed Description. This summary is not intended to identify key features or essential features of the claimed subject matter, nor is it intended to be used as an aid in isolation to determine the scope of the claimed subject matter.

Embodiments of the present invention provide methods and computer-readable media for, among other things, assigning domain-name system (DNS) servers, static IP addresses, and dynamic home agents to mobile devices that request a data session using Internet protocol version 6 (IPv6). In one instance, one or more DNS servers may be identified and assigned to a device based on the device's capabilities, such as a device type, or a program, application, or service that the device is subscribed to. For example, if a device is a Qchat subscriber, a DNS server corresponding to Qchat subscribers may be assigned to that device. Further, static IP addresses and dynamic home agents may be determined and assigned to a device based on whether certain information is defined in a customer-profile database. For instance, a customer-profile database may be queried to determine if a static IP address is defined for a particular device. If it is defined, the device will likely use the static IP address, as well as a static home agent. If it is not defined, the device will likely use a dynamic IP address, and thus a dynamic home agent.

Accordingly, in one aspect, one or more computer-readable media having computer-useable instructions embodied thereon for performing a method of assigning a domain-name system server to a dual-stack mobile-communications device ("device") based on the device's capabilities so that the device is able to establish an Internet protocol data session for accessing various products and services is provided. The method includes receiving a request to initiate the Internet protocol data session on the device that is capable of interpreting both Internet protocol version 4 (IPv4) and Internet protocol version 6 (IPv6) requests, the request including an identifier that identifies the device. Further, the method includes determining one or more device capabilities associated with the device by querying a customer-profile database, in response to receiving the identifier. Based on the one or more determined device capabilities, the method includes identifying the domain-name system server that can be used by the device to translate a host name into a host address and to establish an Internet protocol data session. Additionally, the method includes communicating the domain-name system server to a packet-routing component that assigns the domain-name system server to the device.

In another aspect, one or more computer-readable media having computer-useable instructions embodied thereon for performing a method of assigning a static Internet protocol version 6 (IPv6) address to a dual-stack mobile-communications device ("device") is provided. The method includes receiving a request to initiate on the device an IPv6 data session, and querying a customer-profile database to determine whether the static IPv6 address is defined for the device in the customer-profile database. The method additionally includes communicating the static IPv6 address to a packet-routing component that assigns the static IPv6 address to the device upon determining that the static IPv6 address is defined.

In a further aspect, one or more computer-readable media having computer-useable instructions embodied thereon for performing a method of assigning a dynamic home agent to a dual-stack mobile-communications device ("device") is provided. The method includes receiving a request to initiate on the device an Internet protocol version 6 (IPv6) data session, and querying a customer-profile database to determine if a static IPv6 address for the device is defined in the customer profile database. Further, if the static IPv6 address is defined, the method includes determining from the static IPv6 address a static home agent, and communicating the static home agent to a packet-routing component, wherein the packet-routing component assigns the static home agent to the device. If, however, the static IPv6 address is not defined in the customer-profile database, the method includes determining the dynamic home agent to send to the packet-routing component that assigns the dynamic home agent to the device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of the present invention is described with specificity herein to meet statutory requirements. Although the terms "step" and/or "block" may be used herein to connote different components of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Technology |
| 4G | Fourth-Generation Cellular Communication System |
| AAA | Authentication, Authorization, & Accounting |
| BSC | Base Station Controller |
| BTS | Base Station Transceiver Station |
| CoA | Care-of Address |
| CD-ROM | Compact Disk Read Only Memory |
| CDMA | Code Division Multiple Access |
| CHAP | Challenge Handshake Authentication Protocol |
| CMIPv4 | Client Mobile Internet Protocol Version 4 |
| CMIPv6 | Client Mobile Internet Protocol Version 6 |
| DNS | Domain-Name System |
| DSL | Digital Subscriber Line |
| DVD | Digital Versatile Discs |
| EEPROM | Electrically Erasable Programmable Read Only Memory |
| FAX | Facsimile |
| GSM | Global System for Mobile Communications |
| IP | Internet Protocol |
| IPv4 | Internet Protocol Version 4 |
| IPv6 | Internet Protocol Version 6 |
| LAN | Local Area Network |
| LCP | Link Control Protocol |
| MIPv4 | Mobile Internet Protocol Version 4 |
| MIPv6 | Mobile Internet Protocol Version 6 |
| PDA | Personal Digital Assistant |
| PDSN | Packet Data Serving Node |
| PPP | Point-to-Point Protocol |
| RA | Routing Advertisement |
| RAM | Random Access Memory |
| ROM | Read Only Memory |
| RS | Router Solicitation |
| TV | Television |
| TDMA | Time Division Multiple Access |
| WI-FI | Wireless Interface of Mobile Computing Devices |
| WIMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things, a method, system, or computer-program product. Accordingly, the embodiments may take the form of a hardware embodiment, or an embodiment combining software and hardware. In some embodiments, the present invention takes the form of a computer-program product that includes computer-useable instructions embodied on one or more computer-readable media.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
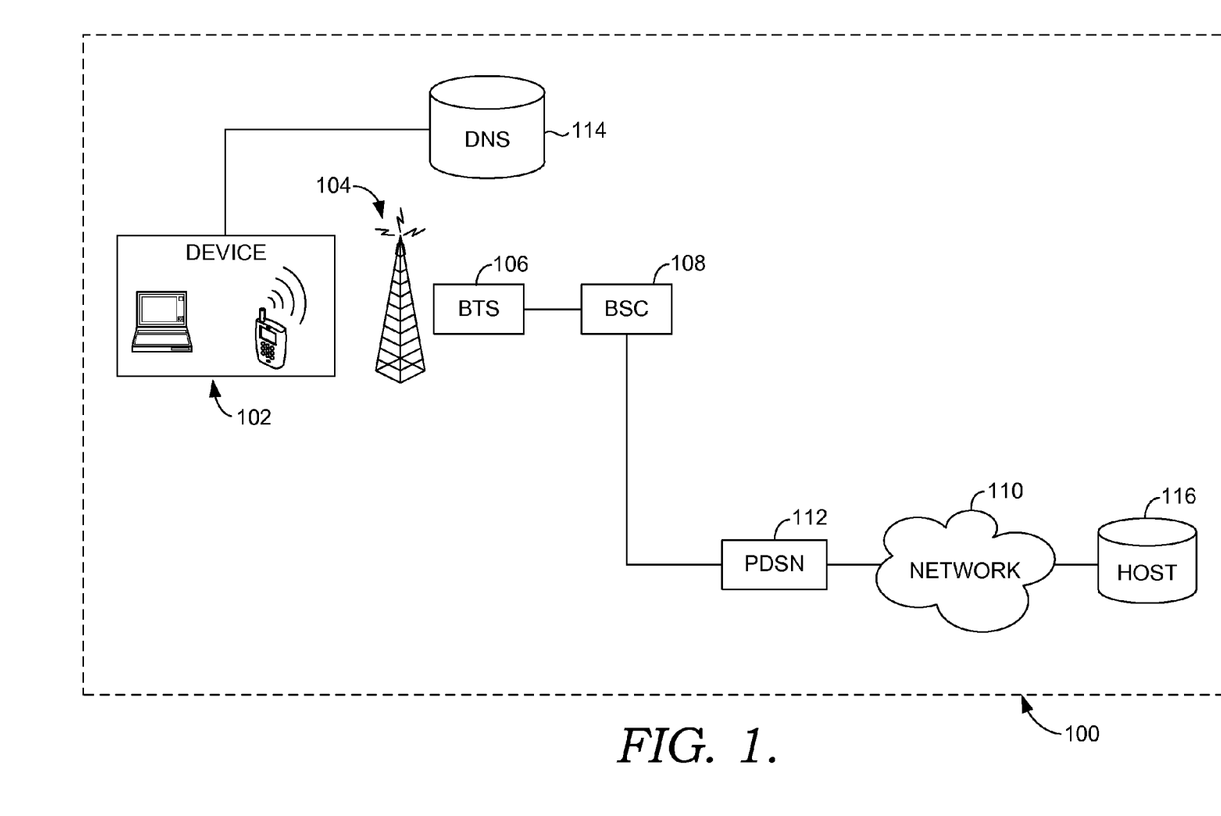
FIG. 1 is a schematic view of an exemplary communications environment suitable for use in implementing embodiments of the present invention.

Referring to the drawings in general, and initially to FIG. 1 in particular, an exemplary network environment suitable for use in implementing embodiments of the present invention is illustrated and designated generally as reference numeral 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated. In the network environment 100, for a device 102 to communicate with a host 116, the device 102 may communicate with a domain name server (DNS) 114 to obtain an Internet Protocol (IP) address of the host 116. The DNS 114 translates host names, e.g., domain names, into host addresses, e.g., IP addresses.

The device 102 communicates over established radio frequencies through a cell tower 104 having a base transceiver station (BTS) 106, a number of which are typically connected to a base station controller (BSC) 108. The BTS 106 may communicate over a wireless air interface with one or more devices, such as device 102, located in the wireless coverage area. The communication between the BTS 106 and the device 102 may occur in a digital format, such as CDMA, TDMA, GSM, 3G, 4G, or 802.11x, or may occur in an analog format, such as AMPS. The BSC 108 manages the communication between a number of BTSs 106 and a limited number of devices 102 compatible with the network environment 100.

Host 116 refers to any computing device that has two-way access to other computer devices on a network, such as the Internet, LAN, any IP-based network, or other public packet data network. Computing device 102 or the computing device used as host 116 may include any device that performs one or more computing functions including, but not limited to, mobile phones, personal digital assistants (PDAs), televisions, laptops, desktop computers, facsimile machines (FAX), digital versatile disk (DVD) players, servers, e.g., a web server, or any other computing device.

The device 102 may communicate with one or more networks 110, such as the Internet or an IP-based network, via a packet data serving node (PDSN) 112. PDSN 112 is a component of a CDMA2000 mobile network, but any network may be used. In the case of a GSM or UMTS network, the GPRS Gateway Support Node (GGSN) performs similar functions as PDSN 112. PDSN 112 may act as the connection point between the Radio Access and IP networks, and may be responsible for managing point-to-point protocol (PPP) sessions between the IP network provided by the mobile provider, and a mobile device. It may also connect BSC 108 to network 110, and may act as a network access server, providing a device access to network 110. In many instances, PDSN 112 may act as an access gateway providing simple IP and mobile IP access, foreign agent support, and packet transport for virtual private networking. In addition, PDSN 112 may act as a client for Authentication, Authorization, and Accounting (AAA) servers and may provide mobile stations with a gateway to the IP network. Alternatively or additionally, the network environment 100 may include other network elements for providing device access to network 110. The device 102 communicates with the host 116 via the network 110.

One skilled in the art will recognize that any network environment 100 having a network suitable for communicating between hosting devices, such as device 102 and host 116, may be utilized for implementing the present invention. Such a network environment 100 may, for example, utilize wireless technology or wired technology for network access. Wireless technology may include any wireless technology including, but not limited to 3G, 4G, WI-FI, WIMAX, and the like. Wired technology includes, for example, wireline, DSL, and the like.

Figure 2:
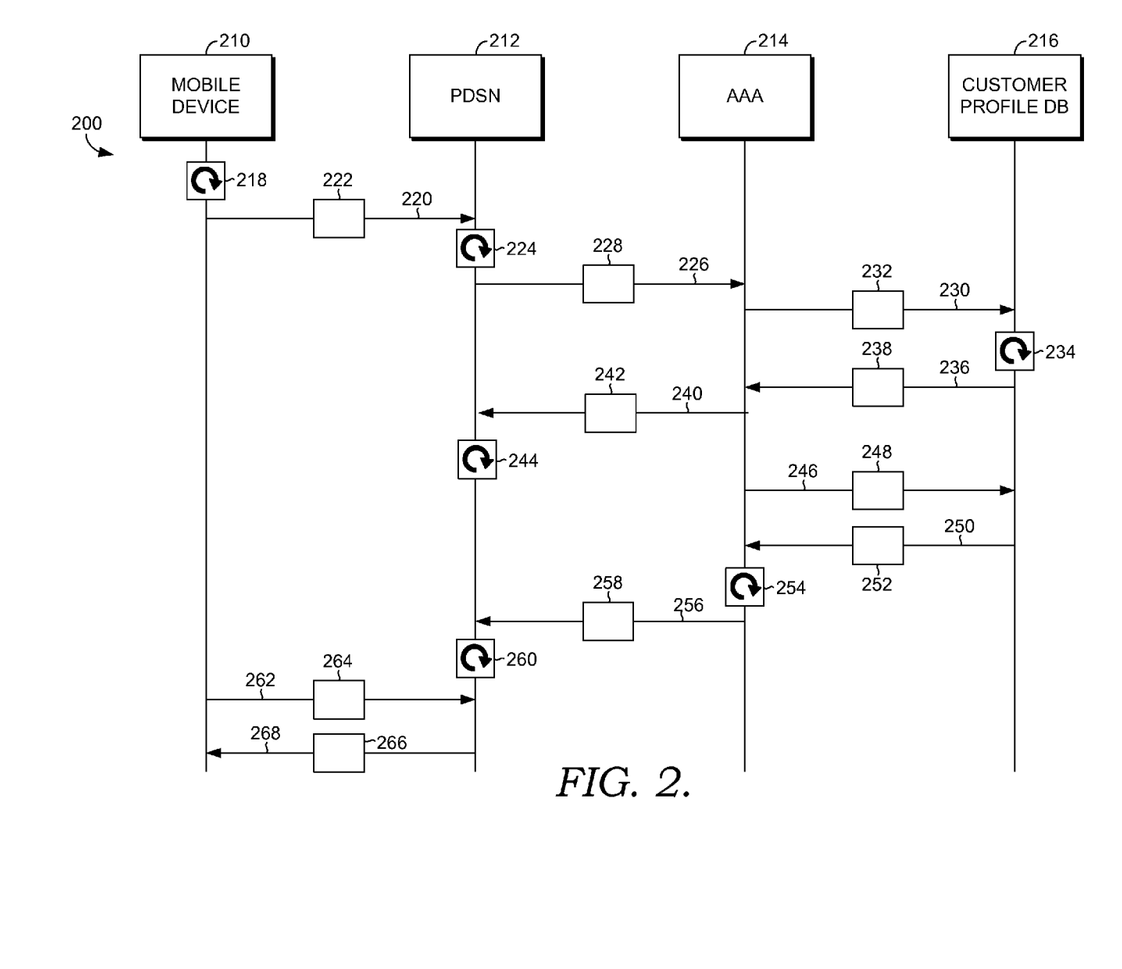
FIG. 2 depicts an illustrative flow diagram of a method for assigning a domain-name system server to a dual-stack mobile-communications device based on the device's capabilities, according to an embodiment of the present invention.

Turning now to FIG. 2, an illustrative flow diagram is shown of a method 200 for assigning a domain-name system server to a dual-stack mobile-communications device (hereinafter "device"), based on the device's capabilities, according to an embodiment of the present invention. Initially, four components are shown as performing various functions and sending and receiving various data. A mobile device 210, in one embodiment, may be a dual-stack mobile-communications device that is capable of interpreting both IPv4 and IPv6 requests. In some instances, the mobile device 210 may be capable of establishing communications, such as data communication sessions, using IPv4 and IPv6 simultaneously. PDSN 212, as described earlier, is a packet data serving node, which is a component of a CDMA2000 mobile network, but embodiments of the present invention may be used with a variety of networks, not just CDMA2000 mobile network. In the case of a GSM or UMTS network, the GPRS Gateway Support Node (GGSN) performs similar functions as PDSN 212.

AAA 214 is a server that provides Internet protocol functionality to support the functions of authentication, authorization, and accounting. Authentication, as used herein, is a technique wherein the user gives credentials to the network so that the network may ensure the user's identity, and also allows for accounting to be enabled so that the user may connect to the network and perform data transfers. Authorization, as used herein, refers to the granting of certain types of privileges, depending on a user's authentication, what privileges they are requesting, and the current system state. Accounting, as used herein, refers to the process of monitoring data transfers so that the end user may be charged for the usage. Customer-profile database 216 may be any type of database that stores information relating to a user, such as, for example, services that the user is subscribed to, IP addresses, the type of phone that the user is currently using, etc. The customer-profile database 216 may be queried by different components for this and other types of information stored in the database 216.

Beginning at item 218, the mobile device 210 initiates a data session, such as if a user of the device 210 has attempted to establish a connection with a website. Various steps may be taken by the device 210 at this time to establish a data session. For exemplary purposes only and not limitation, these steps may include an establishment of an air link connection to the PDSN 212 via the Point-to-Point Protocol (PPP), which allows the device 210 to look like it is directly linked to the PDSN 212, even though it is connected over an air link, through a base station, and across a network, as illustrated in FIG. 1. The Link Control Protocol (LCP) is responsible for the PPP's overall successful operation, as it supervises and controls the PPP, and therefore the term PPP-LCP may be used when referring to the PPP. Once the PPP-LCP configures the request, it may be determined whether the Challenge Handshake Authentication Protocol (CHAP) has been requested. CHAP is an authentication scheme used by PPP servers to validate the identity of remote clients. CHAP is used for devices that are dual-stack, or those that are capable of both IPv4 and IPv6. If a negative acknowledgment is received for CHAP, however, the LCP will be established with a no-authentication option, which may signal that a legacy device is being used, such as an IPv4-only device.

A data session may be initiated by a device for a variety of reasons, including the need to access products and services on the Internet. A mobile device, by way of IPv6, may have the need to gain exposure to products and services, such as anything that a device may currently access using IPv4. For exemplary purposes only, a device may seek to establish a data session to allow a user to download music, surf the web, or do anything else where some target destination needs to be reached. Such a target destination is identified by IPv6, in one embodiment, instead of IPv4.

Once the device 210 has initiated a data session, the device 210 communicates 220 a request 222 to the PDSN 212 to establish a data session. This request 222 may include the establishment of the air link connection to the PDSN, as described above. The PDSN then determines that the device 210 is authorized for use of IPv6 at step 224. For the purposes of embodiments of the present invention, the device 210 may be assumed to be authorized for IPv6, in addition to, in some instances, IPv4. Here, the PDSN 212 may send a challenge to the device 210, which may be responded to by a challenge response by the device 210. The PDSN sends 226 an access-request 228 to the AAA 214. As a result, the AAA 214 sends 230 a query 232 to a customer-profile database 216 to determine one or more values for the device 210 including, but not limited to, a static IPv6 value and a home link prefix. The database 216 attempts to locate this information at step 234, and communicates 236 the results of the query 238 back to the AAA 214. It may now be determined that the device 210 has been successfully authenticated.

With continued reference to FIG. 2, the AAA 214 communicates 240 the received values 242 to the PDSN 212 so that the PDSN 212 can cache the values, shown at step 244. As mentioned, these values may include the static IPv6 value, if one is found in the database 216, and a home link prefix. Other values, or attributes that may be returned in one embodiment include various server identifications (e.g., DNS servers) and any IPv4 information available. The AAA 214 may then query the database 216 again by communicating 246 a query 248 to the database 216. The query 248 may seek to determine a device type for the device 210 that is requesting the data session. For instance, in one embodiment, the device 210 type may be a Qchat subscriber. In another embodiment, the device 210 may be a Smart Device. In other embodiments, a device may be identified as a proxy device, or simply a high-end or low-end device. It will be understood by one of ordinary skill in the art that these devices are listed for exemplary purposes only, as devices come in many types, and all are not listed herein. Further, certain devices may be traditional or standard, and this information may also be returned as a result of the query 248.

Determining a type of device may be done to resolve the DNS server that the device 210 will use during the established data session. For example, if the device 210 is determined to be a Qchat subscriber, the DNS server that will be assigned to the device 210 may be one that is specifically used for Qchat subscriber phones. Alternatively, if the device 210 is a standard or traditional device, the server assigned to the device 210 may be one that is specifically used for traditional devices. Additionally, while DNS server is used herein in the singular form, it is contemplated that more than one server may be assigned to a device, not just one.

The database 216 then communicates 250 the results of the query 252 back to the AAA 214 in the form of a server identification, as described above. The AAA 214 may, in some embodiments, convert or translate the value or identification sent from the database into standard values (e.g., 3GPP2) at step 254, and these values 258 may then be communicated 256 to the PDSN 212. Here, the PDSN may cache these values, as shown at step 260. Once these values are cached, the device 210 sends 262 the PDSN 212 an information request 264 for information that the PDSN has cached (e.g., bootstrapped information). At this time, it may be determined whether the device 210 is going to use a static or dynamic IPv6 address. If a static IPv6 address has been cached by the PDSN 212, the device 210 will likely use a static IPv6 address. Once the IPv6 address is known, a home agent, whether static or dynamic, may then be determined.

Generally, mobile devices will have one permanent address and another for location purposes. Data may be transmitted to the permanent address, which is associated with the home agent, and when the device is traveling, the home agent will forward the data in care of a foreign agent. The PDSN 212 then sends 268 the requested information 266 back to the device 210, and may include values of one or more assigned servers, a standardized form of the home address, the home agent, and the home link prefix, if applicable. Once user credentials have been determined to be valid, the device 210 may be authenticated successfully, and an IPv6, or mobile IPv6 (MIPv6) session is complete.

Figure 3:
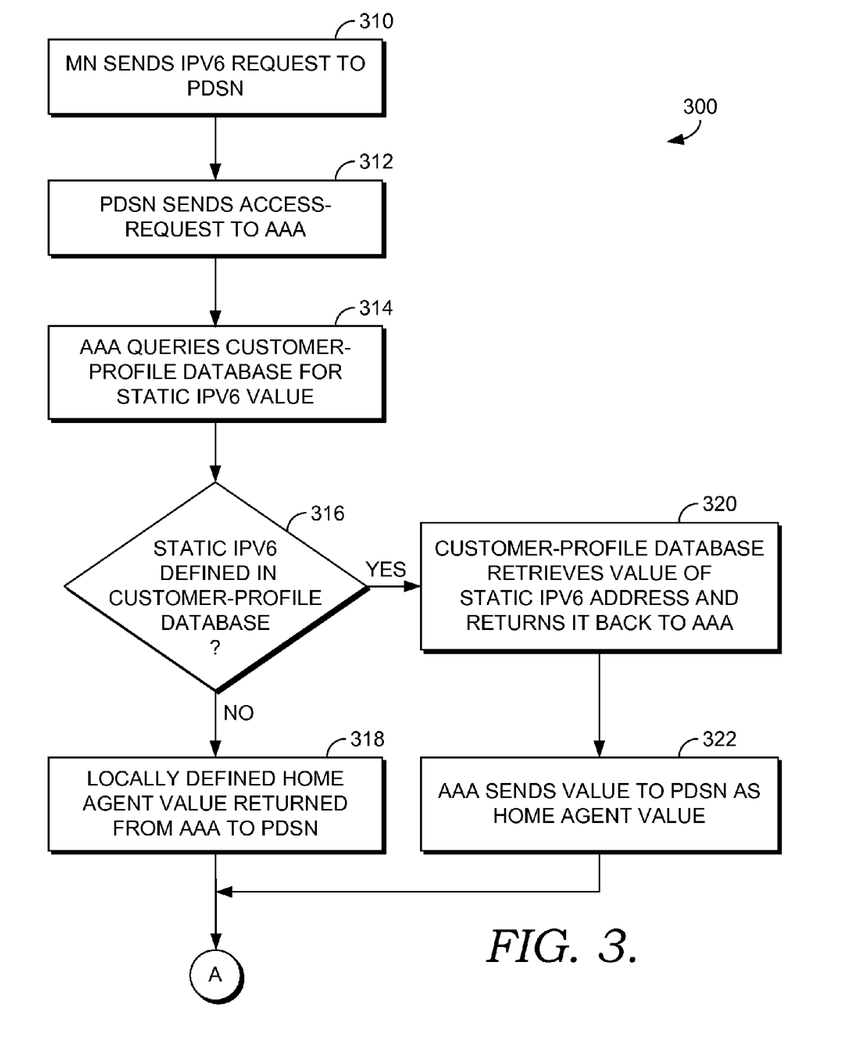
FIG. 3 is an exemplary call flow diagram that illustrates a method for determining a domain-name system server, a static IP address, and a dynamic home agent for a dual-stack mobile-communications device, according to an embodiment of the present invention.

FIGS. 3-8 generally illustrate an exemplary call flow diagram of a method for determining a domain-name system server, a static IP address, and a dynamic home agent for a dual-stack mobile-communications device, according to embodiments of the present invention. Referring to FIG. 3 in particular, a first portion, method 300, of the exemplary call flow diagram is shown. Initially, a device, also referred to as a mobile node (MN) initiates a data session by sending an IPv6 request to a PDSN at step 310. Multiple steps may be taken in order to establish an air link with the PDSN, and to determine if the device is authorized for IPv6. Once PPP-LCP is completed, as described above, the PDSN sends an access-request to the AAA at step 312. This alerts the AAA to then query a customer-profile database (e.g., Server Profile Store (SPS)/Lightweight Directory Access Protocol (LDAP)) for a static IPv6 address, or value, shown at step 314. The customer-profile database may be any type of database. If a static IPv6 value is located within the database, the device will likely use the static IPv6 address, as opposed to a dynamic IPv6 address.

At step 316, it is determined whether a static IPv6 address is defined in the customer-profile database for the device requesting the IPv6 data session. In one embodiment, once an IP address is determined, the home agent may also be determined. As such, if a static IPv6 address is not defined in the database for the requesting device, a locally defined home agent value is returned to the PDSN from the AAA, shown at step 318. A locally defined home agent may also be returned. If, however, a static IPv6 address is defined in the database, the database will retrieve its value, or the static IPv6 address at step 320. A statically defined home agent may also be returned. This address is then returned to the AAA, such that the AAA can return the value to the PDSN at step 322. The value when returned to the PDSN, however, may be the home agent value, or the home link prefix value, and may be sent in addition to, or instead of the static IPv6 address so that it can also be assigned to the requesting device.

Figure 4:
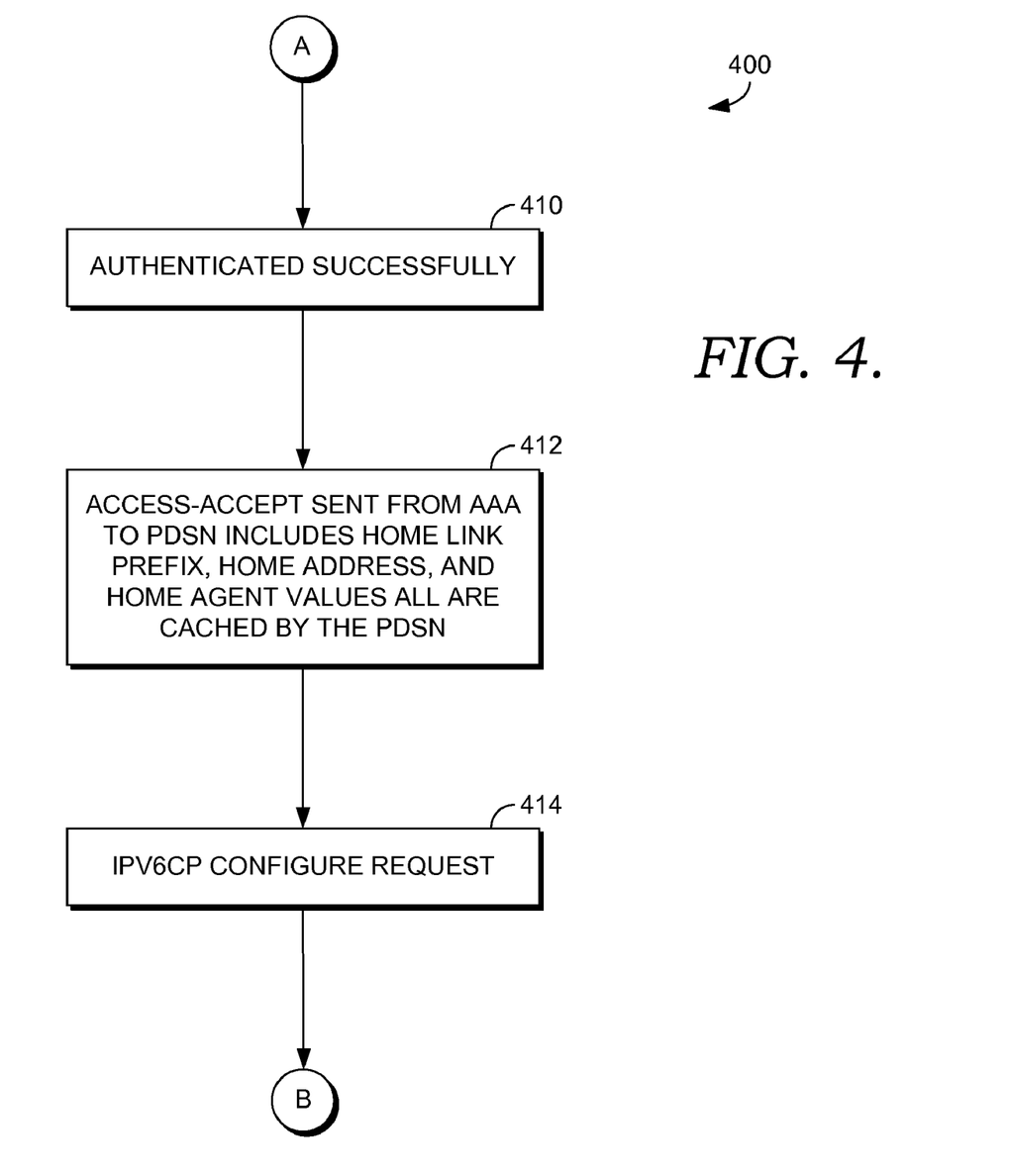
FIG. 4 is a continuation of the exemplary call flow diagram of FIG. 3, which illustrates a method for determining a domain-name system server, a static IP address, and a dynamic home agent for a dual-stack mobile-communications device, according to an embodiment of the present invention.

FIG. 4 illustrates a second portion, method 400, of the exemplary call flow diagram shown in FIGS. 3-8, depicting a method for determining a domain-name system server, a static IP address, and a dynamic home agent for a dual-stack mobile-communications device, according to an embodiment of the present invention. Continuing from FIG. 3, FIG. 4 initially illustrates that at step 410, the device has been successfully authenticated. If it is determined here that the device has not been successfully authenticated, an access-reject may be sent from the AAA to the PDSN, wherein the PDSN may then send an LCP termination event, or may once again attempt to complete PPP-LCP, which is briefly described above. At step 412, an access-accept is sent from the AAA to the PDSN, and includes various values, such as the home link prefix, the home address, and the home agent, if these values have been made available to the AAA. The PDSN then caches these values for retrieval at a later time. The PDSN may have also cached all MIPv4 values, and any domain-name system (DNS) servers that have been determined for the device, although DNS servers are generally determined at a later time, as further described herein. At step 414, IPv6CP configures the request. The IPv6CP configuration request may then be sent to the PDSN.

Figure 5:
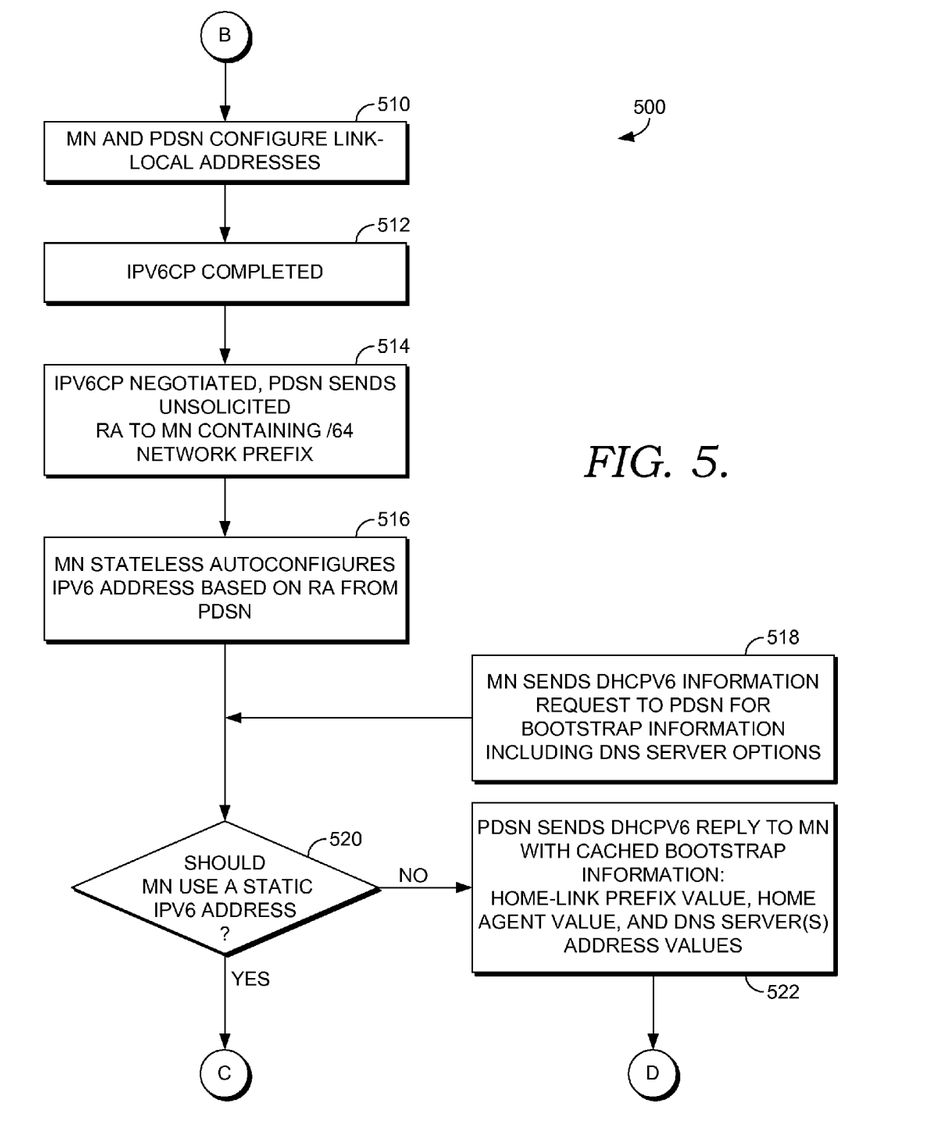
FIG. 5 is a continuation of the exemplary call flow diagram of FIG. 3, which illustrates a method for determining a domain-name system server, a static IP address, and a dynamic home agent for a dual-stack mobile-communications device, according to an embodiment of the present invention.

FIG. 5 illustrates another portion, method 500, of the exemplary call flow diagram shown in FIGS. 3-8, depicting a method for determining a domain-name system server, a static IP address, and a dynamic home agent for a dual-stack mobile-communications device, according to an embodiment of the present invention. Having continued from FIG. 4, step 510 of FIG. 5 provides that the device and the PDSN configure link-local addresses (e.g., FE80 as prefix). Link-local addresses are network addresses that are intended for use only in a local data link layer network, and not for routing beyond that network. More specifically, link-local addresses may be used to automatically assign an IP address to a mobile node in an IP network. At step 512, the IPv6CP is completed, and at step 514, IPv6CP is negotiated, such that the PDSN sends an unsolicited router advertisement (RA) to the device confirming the network prefix.

At step 516, the device stateless autoconfigures an IPv6 address based on the router advertisement sent from the PDSN. Stateless address autoconfiguration is generally where IPv6 hosts may be automatically configured when connected to a routed IPv6 network. As previously mentioned, when first connected to a network, a host (e.g., mobile node or device) may send a router solicitation request for its configuration parameters. If the configuration is suitable, the router (e.g., PDSN) may send a router advertisement packet that contains network-layer configuration parameters. The router advertisement and the router solicitation may be used to configure a simple IPv6 address via a care of address. This is the general process of stateless address autoconfiguration.

With continued reference to FIG. 5, the device sends a DHCPv6 information request to the PDSN for bootstrap information, including DNS server options at step 518. The DHCPv6 is a dynamic host configuration protocol for IPv6. As previously mentioned, the device may not yet have one or more assigned DNS servers, and thus they may be identified, as further described in FIG. 7. It is then determined at step 520 whether the device will use a static IPv6 address. If not, a dynamic home agent will be assigned to the device. At step 522, once it is determined that a dynamic home agent will be used, the PDSN sends a DHCPv6 reply to the device with cached bootstrap information, which may include one or more of a home link prefix value, a home agent value, and DNS server(s) address values.

Figure 6:
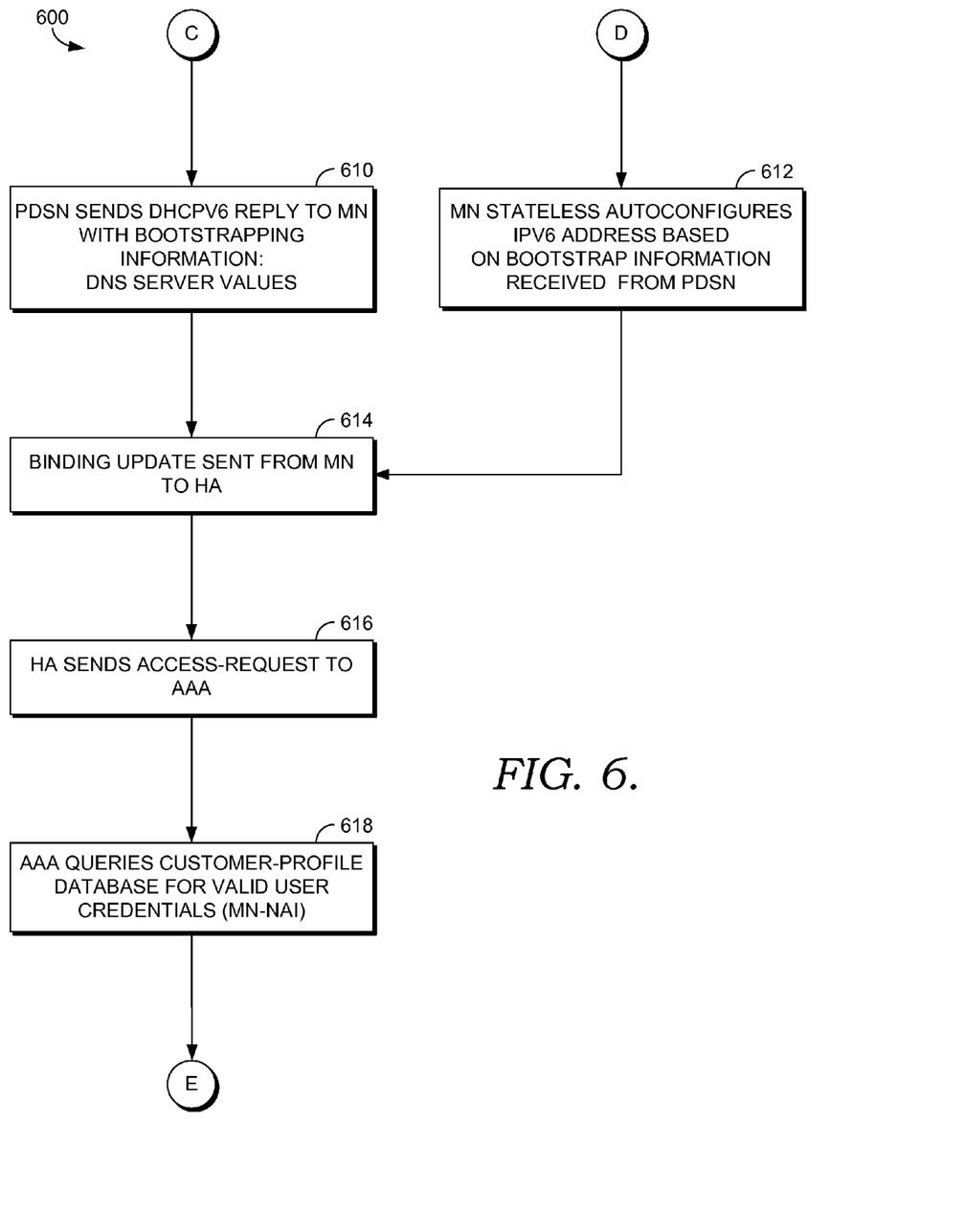
FIG. 6 is a continuation of the exemplary call flow diagram of FIG. 3, which illustrates a method for determining a domain-name system server, a static IP address, and a dynamic home agent for a dual-stack mobile-communications device, according to an embodiment of the present invention.

Turning to FIG. 6, another portion, method 600, is illustrated of the exemplary call flow diagram shown in FIGS. 3-8, depicting a method for determining a domain-name system server, a static IP address, and a dynamic home agent for a dual-stack mobile-communications device, according to an embodiment of the present invention. As discussed above in regard to FIG. 5, if it was not determined that the device will use a static IPv6 address, the PDSN sends the DHCPv6 reply to the device with cached bootstrap information, as shown at step 522. Further, as shown at step 612 in FIG. 6, the device performs a stateless autoconfiguration of the IPv6 address based on the bootstrap information received from PDSN. Home agent IPv6 and HL Prefix v6 values may also be returned. If it was determined at step 520 of FIG. 5 that the device will use a static IPv6 address, step 610 indicates that the PDSN sends the DHCPv6 reply to the device with bootstrapping information, that may include the DNS server value. Static home agent IPv6, Static HL Prefix v6, and static mobile IPv6 values are also returned. At step 614, a binding update is sent from the device to the home agent. The home agent then sends an access-request to the AAA at step 616. The AAA then may query the customer-profile database at 618, and may determine whether the user's credential's are valid. Further, this query of the database will allow for the retrieval of the information in FIG. 7, as detailed below.

Figure 7:
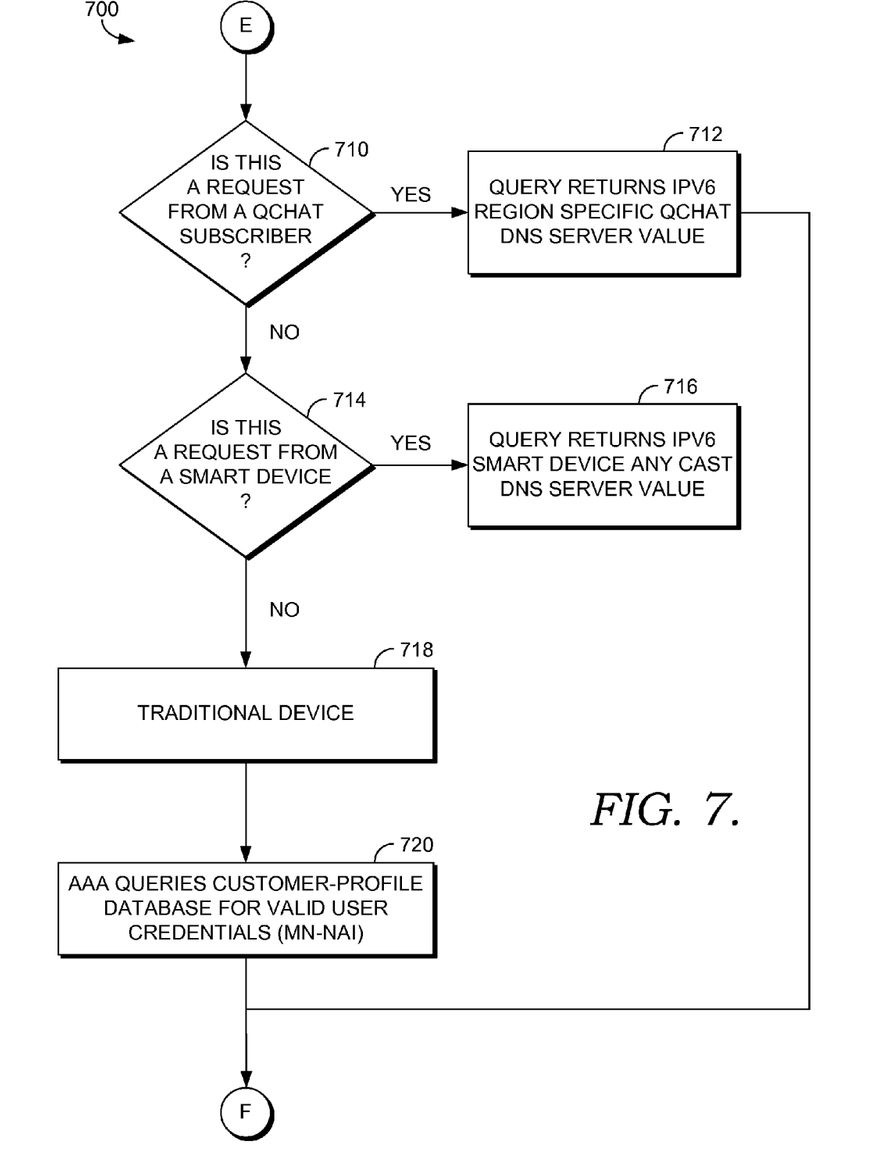
FIG. 7 is a continuation of the exemplary call flow diagram of FIG. 3, which illustrates a method for determining a domain-name system server, a static IP address, and a dynamic home agent for a dual-stack mobile-communications device, according to an embodiment of the present invention.

FIG. 7 illustrates another portion, method 700, of the exemplary call flow diagram shown in FIGS. 3-8, depicting a method for determining a domain-name system server, a static IP address, and a dynamic home agent for a dual-stack mobile-communications device, according to an embodiment of the present invention. As mentioned above, the customer-profile database is queried by the AAA to determine the type of the device so that a DNS server can be assigned to the device that is requesting the data session. At step 710, it is determined whether the request is from a Qchat subscriber. In some instances, the AAA may not query the database for a device type, but may query the database for certain information about the device, such as certain subscriptions that the device is associated with.

At step 712, if it is determined that the request is from a Qchat subscriber, the query returns to the AAA an IPv6 region specific Qchat DNS server value. If the request is not from a Qchat subscriber, it is determined at step 714 whether the request is from a Smart Device. If so, step 716 indicates that the query returns an IPv6 Smart Device DNS server value, which will be assigned to the device. It should be noted that while certain device types and subscriber information are used as examples in the embodiment of FIG. 7, as well as other figures herein, it is contemplated to be within the scope of the present invention that other device types and subscriber information may be queried for in the database. Smart Device and Qchat subscriber are used solely as examples and are not intended to be limiting in any way. In the embodiment of FIG. 7, if the requesting device is neither a Smart Device not a Qchat subscriber, the device may be assumed to be a traditional device, as indicated at step 718. The query will then return the IPv6 traditional device DNS server value, as shown at step 720.

Figure 8:
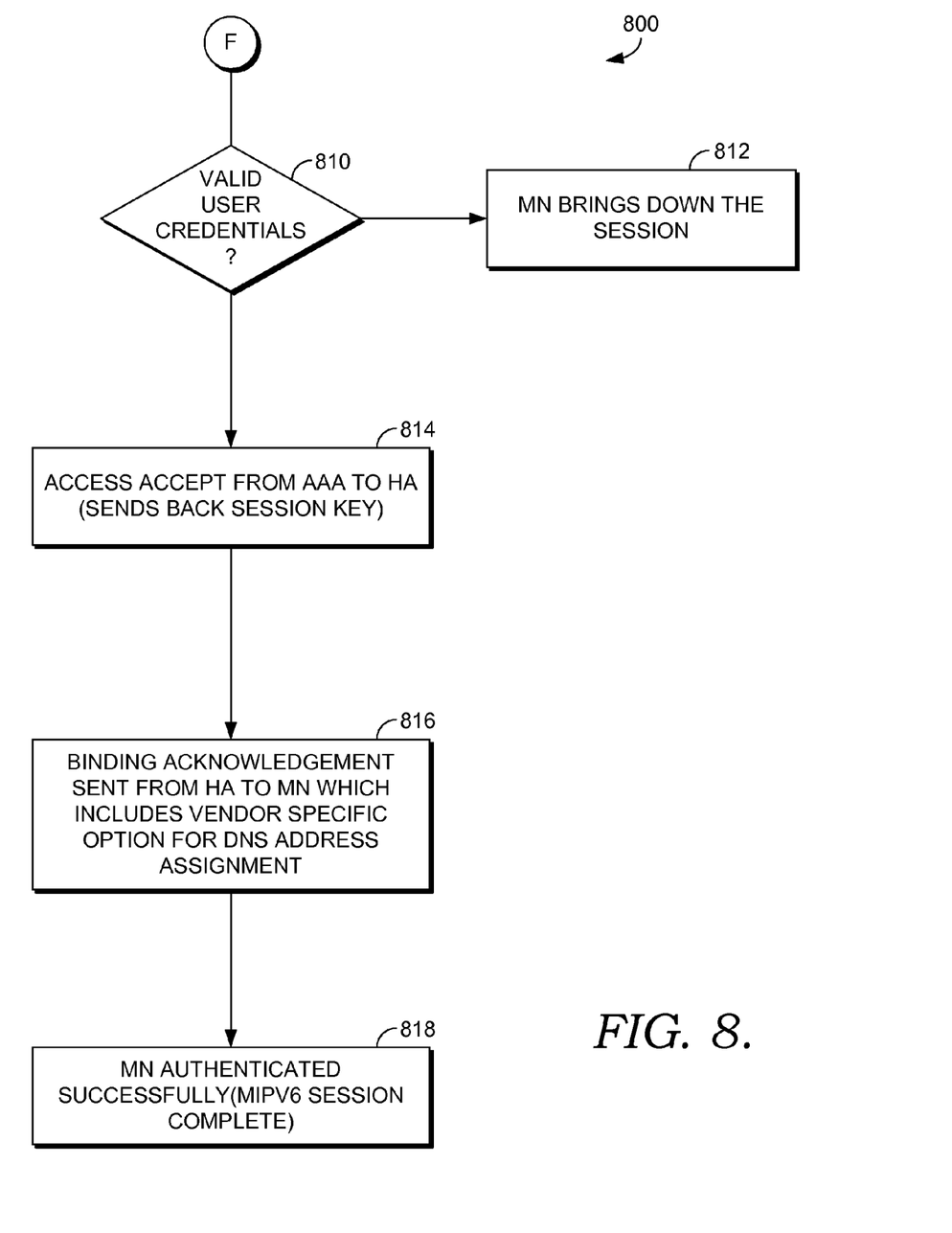
FIG. 8 is a continuation of the exemplary call flow diagram of FIG. 3, which illustrates a method for determining a domain-name system server, a static IP address, and a dynamic home agent for a dual-stack mobile-communications device, according to an embodiment of the present invention.

Referring now to FIG. 8, another portion, method 800, is illustrated of the exemplary call flow diagram shown in FIGS. 3-8, depicting a method for determining a domain-name system server, a static IP address, and a dynamic home agent for a dual-stack mobile-communications device, according to an embodiment of the present invention. Initially, at step 810, it is determined whether the user's credentials are valid. If they are not valid, step 812 indicates that the device tears down or brings down the data session. If, however, the user's credentials are valid, an access accept is sent from the AAA to the home agent, shown at step 814. At step 816, a binding acknowledgment is sent from the home agent to the device, which includes vendor specific options for DNS address assignments. Once the binding acknowledgement is sent, the device has been authenticated successfully, and a mobile IPv6 (MIPv6) session is now complete, which is shown at step 818.

Figure 9:
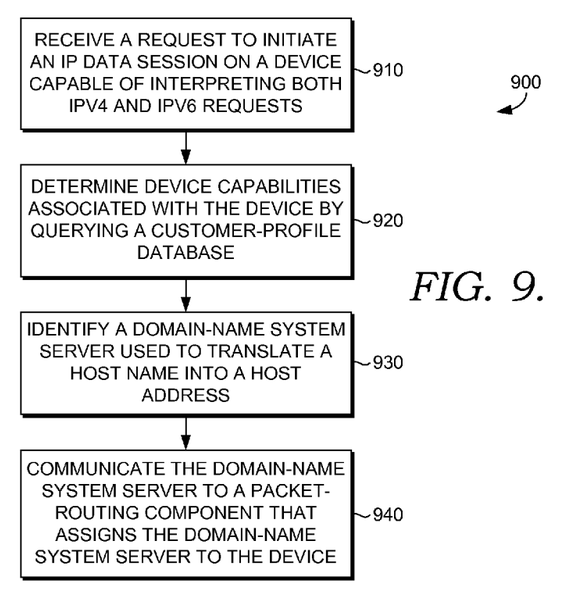
FIG. 9 is an exemplary flow diagram depicting a method for assigning a domain-name system server to a dual-stack mobile-communications device based on the device's capabilities, according to an embodiment of the present invention.

FIG. 9 is an exemplary flow diagram depicting a method 900 for assigning a domain-name system server to a dual-stack mobile-communications device based on the device's capabilities, according to an embodiment of the present invention. A request is received at step 910 to initiate an IP data session on a device. The request, in one embodiment, includes an identifier that identifies the device. This identifier may be of any type, as long as it can uniquely identify the device. In one instance, the identifier is a network access identifier (NAI), which is a standard way of identifying users who request access to a network. The NAI is typically in the form of an e-mail address, such as the e-mail address of the user. This may be used, as it is the username when the user attempts to logon to the system. In other instances, alternate identifiers may be used, including the serial number of the mobile device, a mobile station ID (MSID) that is associated with the service provider and the wireless phone number, and the like.

The device, in one embodiment, is capable of interpreting both IPv4 and IPv6 requests. IPv4 and IPv6, in many computing devices, may coexist. These computing devices are typically referred to as dual-stack devices, as they are able to process both IPv4 and IPv6 packets. Mobile-communication devices, such as but not limited to, cell phones or PDAs may be mobile IP capable. Mobile IP allows a user with a mobile device whose IP address is associated with one network to stay connected when moving to a network that has a different IP address. The user keeps the same IP address, even when roaming between IP networks. Mobile IP technology is embedded in the functionality of packet equipment for 2.5G and 3G networks. Instead of IPv4 or IPv6, mobile device IP technology may be referred to as MIPv4 or MIPv6.

At step 920, one or more device capabilities that are associated with the device are determined. In one embodiment, this is accomplished by the AAA querying a customer-profile database for this information. Device capabilities may include many categories, such as a device type, applications, programs, or services that the device is subscribed to, or capabilities that are inherent to the phone, such as those that may not be possible using a different phone. In one embodiment, device capabilities may also include information located in the user's profile, such as the type of plan that the user is subscribed to. A device type may include, for exemplary purposes only, a Qchat subscriber, a Smart Device, or a standard device, which may be used as the default device.

Based on the device capabilities retrieved from the customer-profile database, one or more DNS servers are identified at step 930. DNS servers are used by the device to translate a host name into a host address, in addition to establishing an IP data session. At step 940, the DNS servers are communicated to a packet-routing component that assigns the DNS servers to the device. In one embodiment, the packet-routing component is a PDSN, which is a component of a CDMA2000 mobile network. In the case of a GSM or UMTS network, the GPRS Gateway Support Node (GGSN) performs similar functions as a PDSN. In one embodiment, prior to the DNS server(s) identification or value being communicated to the packet-routing component (e.g., PDSN), the AAA may convert or translate this value into a value that corresponds to a standards organization, such as a 3GPP2 value.

In addition to the steps described above in relation to the embodiment of FIG. 9, the AAA may also query the customer-profile database for a static IP address, to determine whether the device will be assigned a static IP address or a dynamic IP address. If the static IP address is defined or found in the customer-profile database, its value may be retrieved and returned to the AAA. The AAA may determine, from the static IP address value, a static home agent value that will be assigned to the device. The static home agent value may then be communicated or sent to the packet-routing component (e.g., PDSN). If, however, a static IP address is not defined in the customer-profile database, a locally defined home agent may be communicated or sent to the packet-routing component (e.g., PDSN).

Figure 10:
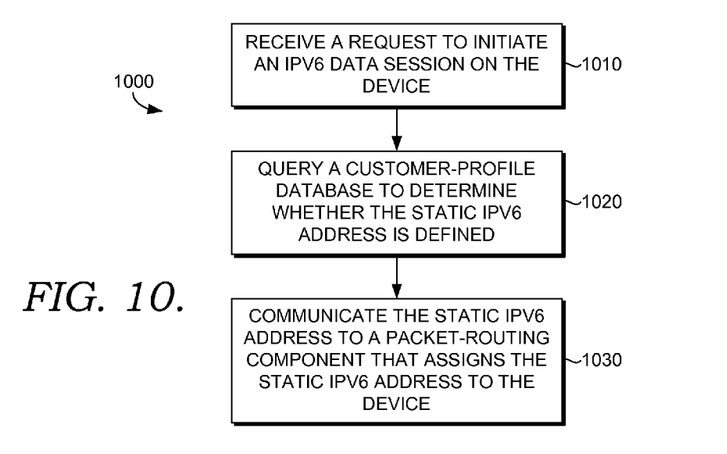
FIG. 10 is an exemplary flow diagram depicting a method for assigning a static IPv6 address to a dual-stack mobile-communications device, according to an embodiment of the present invention.

FIG. 10 is an exemplary flow diagram depicting a method 1000 for assigning a static IPv6 address to a dual-stack mobile-communications device, according to an embodiment of the present invention. Initially, at step 1010, a request is received to initiate an IPv6 data session on the device. A customer-profile database is queried at step 1020 to determine whether a static IPv6 address is defined for the device in the database. Upon determining that the static IPv6 address is defined in the database, the static IPv6 address is communicated to a packet-routing component, such as a PDSN, that assigns the static IPv6 address to the device, as shown at step 1030.

In one embodiment, the device may be authenticated, which may comprise several steps occurring after the device has initiated a data session. For example, if the device is authorized for IPv6, CHAP may be performed, PPP-LCP may be performed and completed, the PDSN may send a challenge to the device, the device may respond to the PDSN with a challenge response, and the PDSN may send an access request to the AAA. The above are provided as exemplary steps, and do not necessarily reflect the exact steps or order of steps that must be taken to authenticate a device. Further, several attributes associated with the device, such as a home link prefix value and a static home agent value may be communicated to the packet-routing component from the AAA, and the packet-routing component may cache these values for future retrieval.

As previously described, a customer-profile database may be queried by the AAA, in one instance, to determine one or more device capabilities associated with the device. For exemplary purposes only and not limitation, these capabilities may include a device type or a program, application, or service that the device is subscribed to. Once the device capabilities are ascertained, one or more DNS servers may be identified that are used by the device to establish an IPv6 data session. Further, the DNS server identifications or values may be communicated to the packet-routing component (e.g., PDSN), which assigns the DNS servers to the device.

Figure 11:
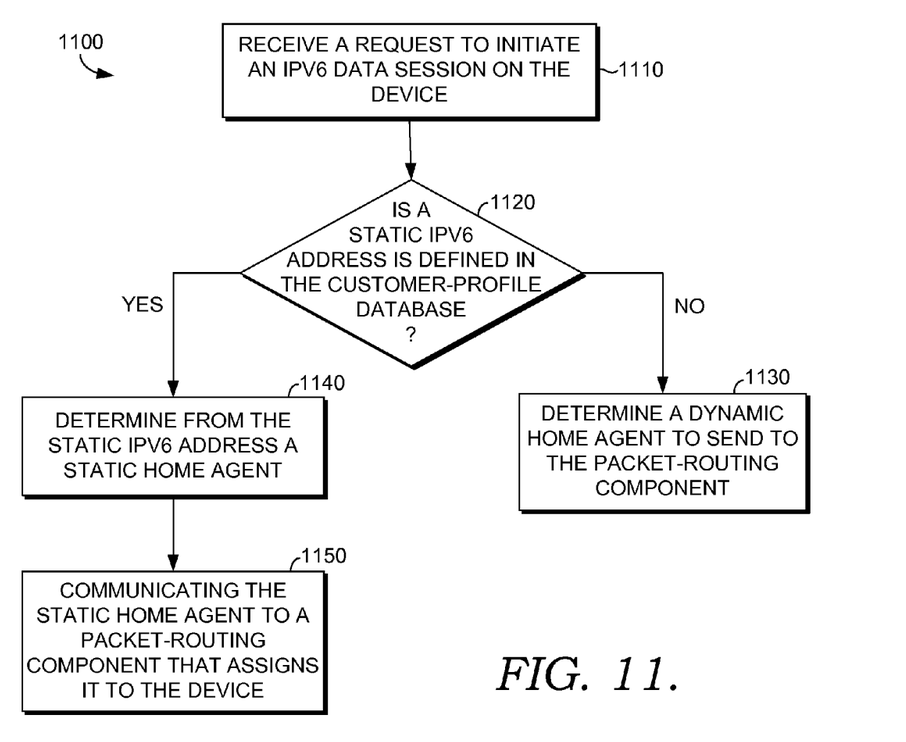
FIG. 11 is an exemplary flow diagram depicting a method for assigning a dynamic home agent to a dual-stack mobile-communications device.

FIG. 11 is an exemplary flow diagram depicting a method 1100 for assigning a dynamic home agent to a dual-stack mobile-communications device. Initially, a request to initiate an IPv6 data session on the device is received, as indicated at step 1110. At step 1120, it is determined whether a static IPv6 address is defined in the customer-profile database. Generally, if a static IPv6 address is defined in the database, the device will use it, but if not, the device may use a dynamic IPv6 address. If a static IPv6 address is not defined, a dynamic home agent is determined at step 1130 and is sent to the packet-routing component (e.g., PDSN). If, however, a static IPv6 address is defined, a static home agent is determined from the static IPv6 address at step 1140. Further, the static home agent is communicated to the packet-routing component (e.g., PDSN) at step 1150, and may then be assigned to the device. In one embodiment, the customer-profile database may also be queried to determine whether the user credentials are valid. If the user credentials are not valid, a data session may not be able to be initiated on the user's device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of assigning a domain-name system server to a dual-stack mobile-communications device ("device") based on the device's capabilities so that the device is able to establish an Internet protocol data session for accessing various products and services, the method comprising:

receiving a request to initiate the Internet protocol data session on the device that is capable of interpreting both Internet protocol version 4 (IPv4) and Internet protocol version 6 (IPv6) requests, the request including an identifier that identifies the device;

in response to receiving the identifier, determining one or more device capabilities associated with the device by querying a customer-profile database;

from two or more available domain-name system servers, identifying the domain-name system server that can be used by the device to translate a host name into a host address and to establish an Internet protocol data session, wherein the domain-name system server is identified based on the determined one or more device capabilities such that the identified domain-name system server is assigned to other devices having similar device capabilities as the device; and communicating the domain-name system server to a packet-routing component that assigns the domain-name system server to the device.

2. The media of claim 1, wherein the identifier is a network access identifier (NAI).

3. The media of claim 1, wherein the one or more device capabilities include a type of device.

4. The media of claim 3, wherein the type of device includes one or more of a Qchat subscriber, a Smart Device, or a standard device.

5. The media of claim 1, further comprising converting a first value associated with the domain-name system server to a second value, such that the second value can be communicated to the packet-routing component.

6. The media of claim 1, further comprising determining whether a static IP address is defined in the customer-profile database.

7. The media of claim 6, further comprising if the static IP address is defined, retrieving a static IP address value.

8. The media of claim 7, further comprising communicating the static IP address value to an Authentication, Authorization, and Accounting (AAA) server.

9. The media of claim 8, wherein the AAA server converts the static IP address value to a static home agent value.

10. The media of claim 9, further comprising communicating the static home agent value to the packet-routing component.

11. The media of claim 6, further comprising if the static IP address is not defined, communicating a locally defined home agent to the packet-routing component.

12. One or more non-transitory computer-readable media having computer-useable instructions embodied thereon for performing a method of assigning a static Internet protocol version 6 (IPv6) address to a dual-stack mobile-communications device ("device"), the method comprising:

receiving a request to initiate on the device an IPv6 data session;

querying a customer-profile database to determine whether the static IPv6 address is defined for the device in the customer-profile database and to determine one or more device capabilities associated with the device;

from two or more available domain-name system servers, identifying a domain-name system server that can be used by the device to translate a host name into a host address and to establish an Internet protocol data session, wherein the domain-name system server is identified based on the determined one or more device capabilities such that the identified domain-name system server is assigned to other devices having similar device capabilities as the device; and communicating to a packet-routing component,
  (1) the static IPv6 address upon determining that the static IPv6 address is defined, wherein the packet-routing component assigns the static IPv6 address to the device, and
  (2) the domain-name system server, wherein the packet-routing component assigns the domain-name system server to the device.

13. The media of claim 12, further comprising authenticating the device.

14. The media of claim 12, further comprising communicating a home link prefix value to the packet-routing component, wherein the packet-routing component caches the home link prefix value.

15. The media of claim 12, further comprising communicating a static home agent value to the packet-routing component, wherein the packet-routing component caches the static home agent value.

16. One or more non-transitory computer-readable media having computer-useable instructions embodied thereon for performing a method of assigning a dynamic home agent to a dual-stack mobile-communications device ("device"), the method comprising:

receiving a request to initiate on the device an Internet protocol version 6 (IPv6) data session;

querying a customer-profile database to determine if a static IPv6 address for the device is defined in the customer profile database and to identify one or more device capabilities associated with the device;

from two or more available domain-name system servers, identifying the domain-name system server that can be used by the device to translate a host name into a host address and to establish the IPv6 data session, wherein the domain-name system server is identified based on one or more device capabilities such that the identified domain-name system server is assigned to other devices having similar device capabilities as the device;

if the static IPv6 address is defined in the customer-profile database,
  determining from the static IPv6 address a static home agent, and
  communicating the static home agent and an identification of the domain-name system server to a packet-routing component, wherein the packet-routing component assigns the static home agent and the domain-name system server to the device; and if the static IPv6 address is not defined in the customer-profile database, determining the dynamic home agent to send to the packet-routing component that assigns the dynamic home agent to the device.

querying a customer-profile database to determine if a static IPv6 address for the device is defined in the customer profile database;

if the static IPv6 address is defined,
  determining from the static IPv6 address a static home agent, and
  communicating the static home agent to a packet-routing component, wherein the packet-routing component assigns the static home agent to the device; and if the static IPv6 address is not defined in the customer-profile database, determining the dynamic home agent to send to the packet-routing component that assigns the dynamic home agent to the device.

17. The media of claim 16, further comprising establishing an IPv6 data session on the device such that the device can access various products and services.

18. The media of claim 16, further comprising querying the customer-profile database for valid user credentials.

* * * * *